United States Patent

Bosshard et al.

[11] 3,904,353
[45] Sept. 9, 1975

[54] METHOD AND APPARATUS FOR THE HEAT TREATMENT OF A MATERIAL IN POWDER FORM

[75] Inventors: Ulrich Walter Bosshard, Winterthur; Arthur Kurt Kupper, Hunzenschwil; Manfred Lohr, Schinznach-Bad, all of Switzerland

[73] Assignee: Holderbank Management & Consulting Ltd., Holderbank, Switzerland

[22] Filed: May 13, 1974

[21] Appl. No.: 469,321

[30] Foreign Application Priority Data
May 14, 1973   Switzerland.......................... 6851/73
Aug. 28, 1973   Switzerland........................ 12286/73

[52] U.S. Cl..................... 432/14; 34/57 R; 432/58; 432/106
[51] Int. Cl.² .......................................... F27B 15/00
[58] Field of Search ......... 432/14, 58, 106; 34/57 R

[56] References Cited
UNITED STATES PATENTS
| | | | |
|---|---|---|---|
| 3,452,968 | 7/1969 | Schimizu et al..................... | 34/57 R |
| 3,563,519 | 2/1971 | Lippmann............................ | 432/58 |
| 3,752,455 | 8/1973 | Zacpal................................. | 432/58 |
| 3,834,860 | 9/1974 | Fukuda et al....................... | 432/106 |
| 3,843,314 | 10/1974 | Ishikawa ............................. | 34/57 R |

FOREIGN PATENTS OR APPLICATIONS
| | | | |
|---|---|---|---|
| 1,184,744 | 1965 | Germany ............................. | 432/14 |
| 1,253,318 | 1961 | France ................................. | 34/57 R |

*Primary Examiner*—John J. Camby
*Attorney, Agent, or Firm*—Robert A. Ostmann

[57] ABSTRACT

The disclosure concerns methods and apparatus for heat treating powdered material wherein the material undergoes an endothermic reaction and is calcined. The material is sintered in the combustion zone of a furnace after preheating by the furnace exhaust gases in open heat exchange relation. Preheating is effected, at least partly, in a stage having a zone in which the material is mixed with furnace exhaust gases, and a zone in which the material is subsequently separated from those gases and from which the separated material is conveyed to the furnace inlet. Additional furnace gases are produced by introducing fuel and air directly into the furnace exhaust gases in a second combustion zone which coincides approximately with the mixing zone of said stage, and material taken from that leaving the separating zone is introduced into this second combustion zone.

28 Claims, 4 Drawing Figures

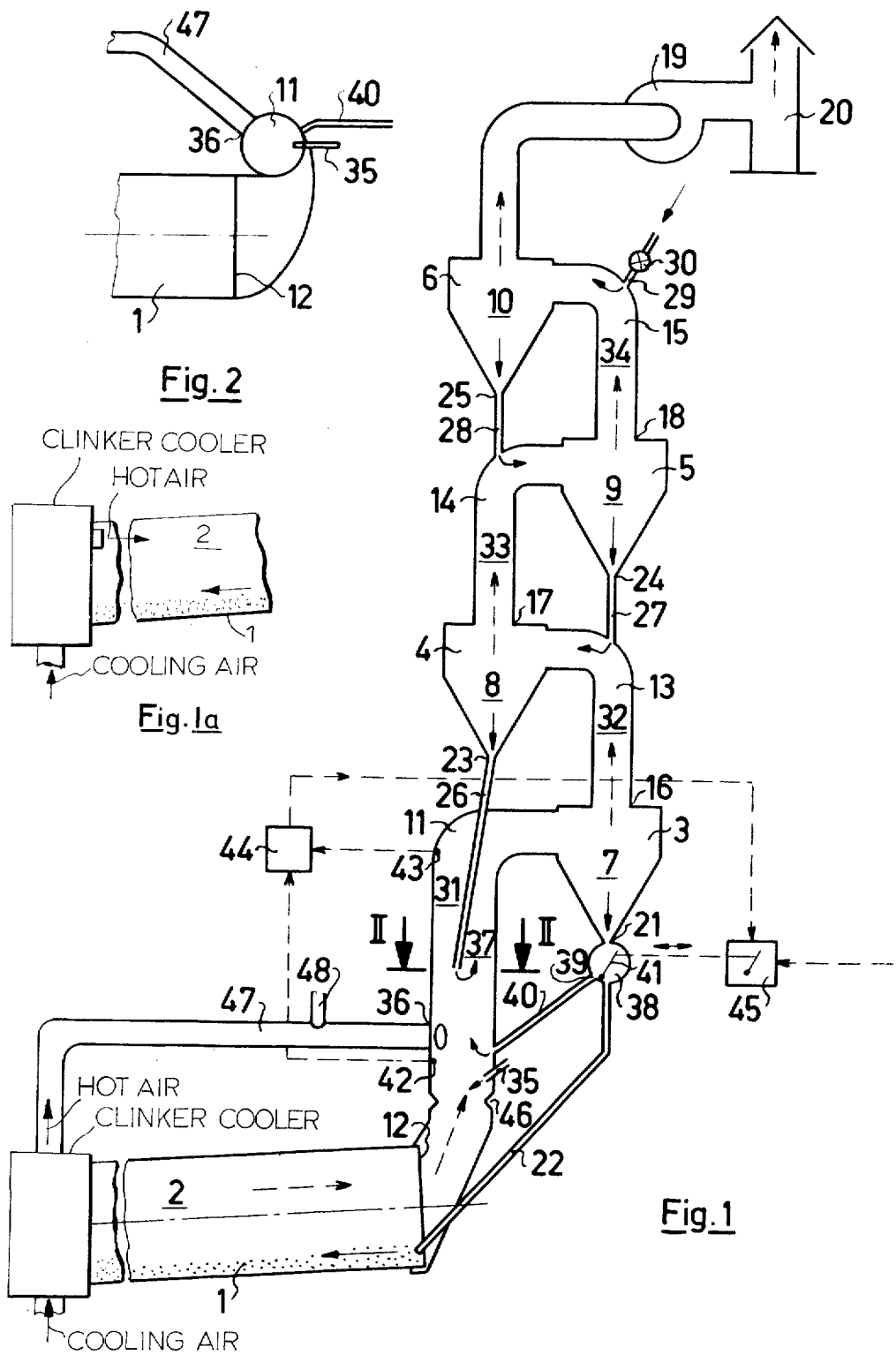

METHOD AND APPARATUS FOR THE HEAT TREATMENT OF A MATERIAL IN POWDER FORM

BACKGROUND OF THE INVENTION

The invention relates to a method for the heat treatment of a material in powder form, during the course of which method the material undergoes an endothermic reaction, in which method the raw material is sintered in a furnace comprising a combustion zone by furnace gases produced by adding fuel and air, and previously preheated in a preheating zone by the furnace exhaust gases in an open heat exchange, and in at least one stage the material is mixed with the furnace exhaust gases in a mixing zone and then separated therefrom again in a separating zone and finally conducted in the direction towards the furnace inlet, in which method additional furnace gases are also produced by means of fuel air outside the furnace in an additional combustion zone and these are mixed with the furnace exhaust gases between the first separating zone, considered in the direction of flow of the furnace exhaust gases, and the furnace inlet, the material being calcined in the preheating zone and/or the additional combustion zone and/or in the combustion zone.

In the heat treatment of powder material usually the heat required for increasing the enthalpy of the material is prepared as the enthalpy of a gas flow at high temperature which has been produced by burning a fuel in air. Increasing the enthalpy of the material is carried out by heat transfer from the gas to the material in such a manner that the material and the gas are brought into contact with one another as far as possible in countercurrent flow. In the interests of good heat transfer it has been found advantageous to suspend the material in the gas flow. But with very fine-grain material it is not possible to produce a technically advantageous relative movement between gas and material. Therefore, the heating of the material takes place in a series of concurrent flow heat exchange stages and separating stages in such a manner that the gas enters the stage at a high temperature and the material at a low temperature, they are thoroughly mixed therein, so that heat exchange takes place, and then are separated from one another again in the separating stage. The individual concurrent flow stages are arranged in series so that in the end a concurrent flow - countercurrent flow heat exchange results.

If during the course of the increase in material enthalpy a strongly endothermic reaction takes place, in other words the material receives a large quantity of heat without substantially increasing its temperature, a single concurrent flow stage can be used for carrying out the change of state in the region of the endothermic reaction without the quality of the heat exchange being lowered relatively to a series arrangement of many concurrent flow stages. But in this case the enthalpy or temperature of the gas flow entering the stage must be so great that the enthalpy reduction of the gas flow can cover the enthalpy increase of the material. In practice this means very high gas temperatures at the stage entrance. If, for example, it is desired to deacidify raw cement meal which has been preheated in countercurrent flow with the exhaust gases to 850°C with the theoretically minimum necessary quantity of gas, gas inlet temperatures of more than 1800°C are required. Such high gas temperatures result in local overheating, so that the apparatus becomes encrusted and the refractory walls are subjected to rapid wear.

Several methods of the type initially described are already known. According to one method the endothermic reaction is carried out for the greater part in a rotary furnace which, considered in the direction of material flow, is followed by the suspension heat exchanger. This rotary furnace is used at the same time for heating the material beyond the calcining temperature. The heat transfer in the rotary furnace, however, is substantially poorer than in a suspended bed of powder, so that the rotary furnace has much lower output in relation to its size. Furthermore it is liable to develop trouble, being a moving unit, and it is expensive.

According to another known method the endothermic reaction is carried out almost completely in a shaft or vortex oven constructed in cyclone manner; only the heating of the material to above the calcining temperature is carried out if necessary in a rotary furnace (or another furnace system). Depending on the type of reaction carried out, 40-100% of the heat required for carrying out the process is produced in the oven by combustion and supplied to the material. The rotary furnace which may be arranged downstream is correspondingly smaller and more economical.

All methods known at present for the heat treatment of material in powder form, however, have one or more of the following disadvantages:

a. They have a fluidised bed bottom for distributing the fluidising and combustion air; therefore they require dust-free hot air under high pressure. The measures required for this purpose and the apparatus required are very costly and liable to develop faults.

b. They are suitable only for relatively large-particle material (few particles <90 $\mu$).

C. If they do not have a fluidised bed bottom they use hot exhaust air from which dust has been extracted and/or oxygen-containing exhaust gases as process stages, which are arranged downstream of the calcining stage in the direction of material flow. But this kind of vortex furnace has only a low thermal inertia, so that temperature constancy in the vortex oven such as is necessary for smooth operation is not achieved, if the material throughout varies with regard to time. Short-duration fluctuations in quantity flow, however, are technically hardly avoidable, if the vortex oven is preceded by a suspension preheater in the direction of material flow.

SUMMARY OF THE INVENTION

To overcome the disadvantages mentioned above, the invention provides a method measures, the type initially described in which the additional furnace gases are produced by introducing fuel and air directly into the furnace exhaust gas flow in a second combustion zone which coincides approximately with the mixing zone, and in which, from the flow of material, a return flow is branched off and introduced into the second combustion zone. With these measure, it is possible to dispense with providing a special combustion chamber and/or a complicated fluidised bed bottom supplied by expensive and delicate compressors, and it is possible, with means which are very simple to construct and operate, to maintain the desired high concentration of material in the second combustion zone which is important for obtaining as far as possible complete execution of the process and complete additional combustion.

In one embodiment of the method, the return flow is branched off from the flow of material downstream of the first separating zone, considered in the direction of flow of the furnace exhaust gases. This feature has the advantage of requiring the lowest apparatus outlay. In another embodiment, the furnace exhaust gases are divided into two part-flows upstream of the first separating zone, considered in the direction of flow of the said gases, and conducted separately through the first separating zone, the flow of material leading to the furnace inlet being obtained from one of the part-flows and the return flow from the other part-flow. Although this method requires a greater outlay for apparatus, it makes it possible to obtain a division of the material into material flow and return flow which can be controlled in a reliable manner as regards quantity under all operating conditions, more particularly situations when there are considerable fluctuations in the flow of raw material and the like.

According to a feature, the allocation of the return flow relatively to the material is so regulated that the pressure difference between the inlet and outlet ends of the second combustion zone, which is a measure of the quantity of material held in suspension, remains constant. According to another feature, therefore, the pressures at the inlet and outlet ends of the second combustion zone are measured and the difference result which is ascertained is used for regulating the return flow relatively to the material flow.

Preferably, additional turbulence of the furnace exhaust gases is produced in the second combustion zone so that good utilization of the oxygen content of the air is achieved and local overheating of the material is avoided. Such turbulence may be achieved by introducing the fuel and/or the air into the second combustion zone in a direction or directions different from the general direction of flow of the furnace exhaust gases. It may also be produced by introducing the fuel and/or the air into the second combustion zone at a speed which is high in relation to the speed of the furnace exhaust gases, or by introducing the furnace exhaust gases tangentially into the second combustion zone.

The mean speed of the furnace exhaust gases within the second combustion zone, in relation to the speed of the said gases upstream of said zone, maybe increased or decreased at least over a partial distance. These measures achieve additional turbulence in the furnace exhaust gases and afford other advantages. By increasing the speed of the furnace exhaust gases, the result is achieved that the entire material of the return flow is reliably conveyed as far as the separating zone. On the other hand, a reduction in speed prolongs the time during which the material remains in the furnace exhaust gas flow as far as may be necessary.

According to a further feature of the invention, the material treated is cooled by means of cooling air in an open heat exchange, and the hot cooling air produced as a result is supplied at least partly to the furnace exhaust gas flow. The hot cooling air may be supplied to the furnace exhaust gases through the furnace itself. This arrangement is used for example when a rotary furnace is followed by a planetary cooling apparatus. An alternative scheme, used when the furnace is followed by grid cooling apparatus, delivers hot cooling air to the second combustion zone through a furnace by-pass.

According to another feature of the invention, liquid fuel is introduced into the second combustion zone in such a manner, that is to say more particularly as regards quantity, speed, and direction and distribution, that it is precipitated at least partly on the particles of material and is evaporated again therefrom or burned thereon. Finally, according to a further feature, the concentration of material in the second combustion zone is kept so high that the formation of a proper flame is at least partly prevented.

The invention also provides apparatus for carrying out the method described hereinbefore. This apparatus comprises a furnace having a combustion zone, and also at least one separating device containing a separating zone which is connected by an approximately vertical furnace exhaust gas pipe with the furnace inlet or with the exhaust gas union of a separating device situated immediately upstream thereof, as considered in the direction of furnace exhaust gas flow. The material discharge union of the first separating device in the direction of furnace exhaust gas flow is connected with the furnace inlet, the material discharge unions of further separating devices which may be included are connected by way of material conduits with the furnace exhaust gas pipe of the separating device immediately preceding in the direction of furnace exhaust gas flow, and a material supply conduit is connected to that furnace exhaust gas pipe which opens into the last separating device as considered in the direction of furnace exhaust gas flow. The furnace exhaust gas pipe of each device contains a mixing zone, and the furnace exhaust gas pipe between the furnace and the first separating device, considered in the direction of furnace exhaust gas flow, contains the second combustion zone, which coincides at least approximately with the mixing zone. The second combustion zone is provided with devices for introducing fuel and air. The apparatus also includes means for branching a return flow from the material flow leaving said first device, and a return conduit for conducting the return flow into the second combustion zone.

In one embodiment, the first separating device, as considered in the direction of furnace exhaust gas flow, comprises a single part having a material junction provided with two discharge unions. One union is connected to a material conduit which leads to the furnace inlet, and the other is connected to the return conduit. The junction comprises a continuously adjustable distributing element. In another embodiment, said first separating device comprises two parts each with a furnace exhaust gas duct separated from the other and arranged parallel thereto. The material discharge union of the first part is connected by way of the material conduit to the furnace inlet, and the material discharge union of the other part is connected by way of the return conduit to the second combustion zone. The furnace exhaust gas pipe of at least one part of the first separating device comprises, at a point situated downstream of the said separating device in the direction of exhaust gas flow, a continuously adjustable closure element.

Preferably, the furnace exhaust gas pipe comprises below and above the second combustion zone in each case a pressure sensing element, these elements being connected to a pressure difference meter which is in operative connection by way of a controller with an adjusting motor which is connected to the distributing element of the junction or to the closure element downstream of one part of the first separating device. These measures allow automatic control of the installation.

To produce the aforesaid turbulence in the furnace exhaust gases in the second combustion zone, various arrangements are proposed. According to one arrangement, the devices for introducing fuel and/or air open into the additional combustion zone in a direction or directions different from the axis of the furnace exhaust gas pipe. Looking at right angles to the axis of the furnace exhaust gas pipe, it is possible to have a direction at right angles or at an inclination to the said axis, and, looking in the direction in which the said axis extends, it is possible to have a tangential or radial direction relatively to the cross-section of the furnace exhaust gas pipe. Turbulence may also be produced by connecting the furnace inlet in a tangential relationship to the furnace exhaust gas pipe, that is to say the axis of the furnace is offset relatively to the axis of the furnace exhaust gas pipe.

According to a further feature the furnace exhaust gas pipe comprises, in the region of the second combustion zone, constrictions or inserts narrowing its internal diameter and/or extensions which enlarge its internal diameter.

In some cases, for example when a rotary furnace is followed by a planetary cooling apparatus, the air for the second combustion zone is supplied through the furnace into the furnace exhaust gas flow, so the furnace itself serves as the air supply conduit for the additional combustion zone. In other cases, for example when the furnace is followed by a grid cooling apparatus, an air supply conduit which is taken past the furnace is provided for the additional combustion zone.

BRIEF DESCRIPTION OF THE DRAWINGS

Several embodiments of the invention are described herein in detail with reference to the accompanying drawings, in which:

FIG. 1 shows a view in section of an installation for the production of cement clinker, FIG. 1a shows a modification of a portion of the FIG. 1 apparatus FIG. 2 is a section taken on the line II—II of FIG. 1.

In all the illustrations, like parts are designed with like reference numerals.

DESCRIPTION OF ILLUSTRATED EMBODIMENTS

Figure 3:
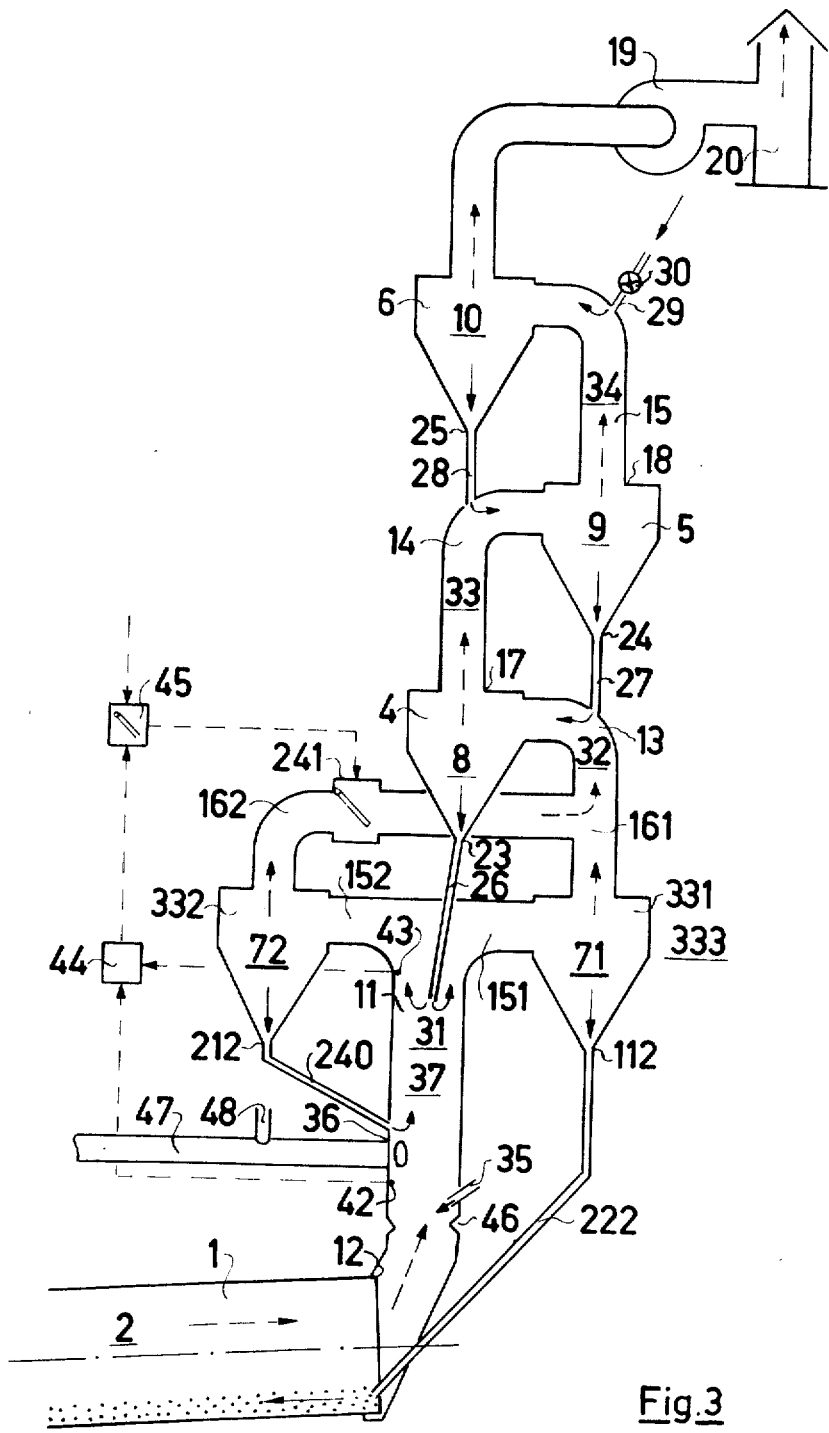
FIG. 3 shows a view in section of another installation.

In FIG. 1, the reference numeral 1 designates a rotary furnace which contains a combustion zone 2. Numerals 3, 4, 5 and 6 designate four cyclones which define separating zones 7, 8, 9 and 10. The cyclone 3 is connected by a vertical furnace exhaust gas pipe 11 to the inlet 12 of the furnace 1. The cyclones 8, 9, 10 are connected by furnace exhaust gas pipe 13, 14, 15 to the exhaust gas unions 16, 17, 18 of the particular cyclone 7, 8, 9 situated upstream in the direction of the furnace exhaust gas flow. The last cyclone 10 is connected by a fan 19 to a chimney 20.

The material discharge union 21 of the first cyclone 7 is connected by way of a material conduit 22 to the inlet 12 of the furnace 1 and the material discharge unions 23, 24, 25 are connected by material conduits 26, 27, 28 to the furnace exhaust gas pipes 11, 13, 14 of the upstream cyclones 7, 8, 9 in each case. A material supply conduit 29 into which a rotary air lock 30 is arranged opens into the furnace exhaust gas pipe 15 of the last cyclone 10.

The furnace exhaust gas pipes 11, 13, 14, 15 comprise mixing zones 31, 32, 33, 34.

The directions of flow of the furnace exhaust gases are shown in broken lines and the directions of the material in full lines.

The furnace exhaust gas pipe 11 between the furnace 1 and the first cyclone 3 contains a second combustion zone 37 which coincides with the mixing zone 31, the devices 35, 36 for introducing fuel and air into the additional combustion zone 37 opening into the furnace exhaust gas pipe 11, and the material conduit 22 between the first cyclone 3 and the furnace 1 comprises a junction 38 whose other discharge union 39 is connected by a return conduit 40 with the additional combustion zone 37.

The junction 38 comprises a continuously adjustable distributing element 41. The furnace exhaust gas pipe 11 comprises in each case below and above the second combustion zone 37 a pressure sensing element 42, 43, these elements being connected to a pressure difference meter 44 which is operatively connected by means of a controller not shown here to an adjusting motor 45 connected to the distributing element 41.

The device 35 for introducing liquid fuel opens, as viewed at right angles to the axis of the furnace exhaust gas pipe 11, at an inclination to the said axis into the second combustion zone 37. The device 36 for introducing air opens, as viewed in the direction of the axis of the furnace exhaust gas pipe 11, tangentially into the combustion zone 37. At the same time the device 35 opens into the additional combustion zone 37 radially, considering the axis of the furnace exhaust gas pipe 11, and the device 36, considered in the direction at right angles to the said axis, opens into the combustion zone 37 at right angles to the said axis.

The furnace inlet 12 is connected tangentially to the furnace exhaust gas pipe 11, that is to say the axis of the furnace 1 is offset relatively to the axis of the furnace exhaust gas pipe.

The furnace exhaust gas pipe 11 comprises in its lower portion a constriction 46. It could also be provided with an insert narrowing the internal diameter. The furnace exhaust gas pipe 11 could also be given a suitable widening.

In the FIG. 1 constructional example, the air for the second combustion zone 37 comes from a grid cooling apparatus for the hot clinker, which apparatus is connected by an air supply conduit 47 extending past the furnace 1 to the device 36 for introducing air. If the air comes from a planetary cooling apparatus, (see FIG. 1a) it would pass through the furnace 1 into the exhaust gas pipe 11 or into the second combustion zone 37.

If the hot cooling air coming from the grid cooling apparatus is not sufficient, the air supply conduit 47 comprises an entry 48 through which additional air can be introduced into the air supply conduit 47, and advantageously heat is obtained at some point in the system for preheating the additional air. It is important that the additional air is mixed in a satisfactory manner with the air coming from the grid cooling apparatus so that air at the same temperature always enters the second combustion zone 37, for which reason the entry 48 is arranged as far as possible from the combustion zone 37.

The installation operates as follows. The cold cement meal is supplied through the rotary air lock 30 and the material supply pipe 29 into the three-stage cyclone preheater 10, 9, 8. It falls through these three cyclones and is preheated in known manner by the furnace exhaust gases until it arrives through the pipe 26 at a temperature of about 800°C at the mixing zone 31.

In the oven 1, or its combustion zone 2, the preheated material is sintered in a manner which is also known.

In the second combustion zone 37, which coincides with the mixing zone 31 or at least approximately, material is present from the conduit 26 and also from the return conduit 40. This material is acted upon by liquid fuel from the device 35. The liquid fuel is introduced into the second combustion zone in such a manner, that is to say more particularly as regards quantity, speed, direction and distribution, that it is precipitated at least partly on the particles of material and is evaporated therefrom again or is burned on the particles of material. The quantity of fuel is regulated so that the temperature in combustion zone 37 remains constant.

The material is calcined in the second combustion zone. It is possible to shift the entire calcining operation into this combustion zone 37. However, in actual practice it is advantageous to arrange for a small proportion of about 5% of the calcining process to take place in the furnace 1, or its combustion zone 2. In this way the result is achieved that when there are small variations in the supply of material and/or fuel the temperature only fluctuates slightly. With suitably high temperatures, calcining takes place to a relatively small extent also in the separating device 3 and in the furnace exhaust gas pipes 13 etc.

Owing to the arrangements for introducing fuel and air into the second combustion zone 37 in a direction which is different from the general direction of the furnace exhaust gases, and also owing to the tangential introduction of the furnace exhaust gases into the exhaust gas pipe 11, additional turbulence of the furnace exhaust gases is brought about. This produces intense mixing of the material with the furnace exhaust gases. Owing to the constriction 46 and/or the widenings in the furnace exhaust gas pipe 11, not only is turbulence produced in the furnace exhaust gases, but the former measure ensures that all the material is conveyed from the return conduit 40 to the separating zone 3, and the latter measure gives the desired long residence of the material in the second combustion zone 37. Because of all these measures the desired calcining reaction takes place in a more complete manner.

Because of returning material from the lowest cyclone 3 into the second combustion zone 37, the desired high concentration of material is obtained, and thus the production of a true flame is prevented. A better mixing of the material is also obtained. The gas-material mixture is given greater thermal inertia and thus temperature variations when the supply of material fluctuates, such as occur in normal mixing stages, are absorbed and the ignition of the fuel is ensured. Therefore, the second combustion zone acts as a buffer zone for fluctuating flows of material, and the furnace 1 is charged with a uniform flow of material.

The division of the flow of material leading to the furnace 1 and the return flow to the second combustion zone 37 is regulated by the distributing element 41 in the junction 38, controlled by the pressure sensing elements 11, 12.

In the FIG. 3 embodiment, the first separating device 333, in the direction of furnace exhaust gas flow, comprises two cyclones 331, 332 with separating zones 71, 72 whose furnace exhaust gas ducts are connected in parallel by means of supplying furnace exhaust gas pipes 151, 152 and discharging furnace exhaust gas pipes 161, 162. The material discharge union 112 of one cyclone 331 is connected through the agency of a material conduit 222 with the furnace inlet 12 and the other cyclone 332 is connected through the agency of a return conduit 240 with the second combustion zone.

The outgoing furnace exhaust gas pipe 162 of the cyclone 332 comprises at a point situated downstream of the cyclone 332, considered in the direction of flow of the furnace exhaust gases, a continuously adjustable closure element 241. The furnace exhaust gas pipe 11 comprises below and above the second combustion zone 37 in each case a pressure sensing element 42, 43, which elements are connected to a pressure difference meter 44 which is operatively connected by means of a controller not shown here to an adjusting motor 45 connected to the closure element 241.

We claim:

1. A method for the heat treatment of a material in powder form, during the course of which the material undergoes an endothermic reaction and is calcined, which method includes the steps of sintering the raw material in a furnace having a combustion zone by furnace gases produced by supplying fuel and air, preheating the material at least partly in a preheating stage having a mixing zone in which the material is mixed with furnace exhaust gases and a separating zone in which the material is separated from those gases and from which separating zone it is conducted to the furnace inlet, and producing additional furnace gases by means of fuel and air outside the furnace in a second combustion zone and mixing these gases with the furnace exhaust gases between said stage and the furnace inlet, characterized by the steps of producing said additional furnace gases in the furnace exhaust gas flow by introducing fuel and air directly into the said flow, the second combustion zone coinciding approximately with said mixing zone; and branching off from the flow of material a return flow and introducing same into the second combustion zone.

2. A method as defined in claim 1 further characterized by providing said stage with a single separating zone, and by branching off said return flow from the material discharge from this zone.

3. A method as defined in claim 1 further characterized by dividing the furnace exhaust gases into two part-flows upstream of the separating zone and passing the part-flows separately through portions of that zone; obtaining the material flow leading to the furnace inlet from one of the part-flows; and taking the return flow from the other part-flow.

4. A method as defined in claim 1 further characterized by regulating the division of the return flow from the material flow so that the pressure difference between the inlet end and outlet end of the second combustion zone remains constant.

5. A method as defined in claim 4 further characterized by measuring the pressures at the inlet and outlet ends of the second combustion zone, obtaining the difference between said pressures, and regulating the return flow relatively to the material flow in accordance with that difference.

6. A method as defined in claim 1 further characterized by producing turbulence in the furnace exhaust gases in the second combustion zone.

7. A method as defined in claim 6 further characterized by introducing at least one of the streams of fuel and air into the second combustion zone in a direction different from the general direction of flow of the furnace exhaust gases.

8. A method as defined in claim 6 further characterized by introducing at least one of the streams of fuel and air into the second combustion zone at a high speed in relation to the speed of the furnace exhaust gases.

9. A method as defined in claim 6 further characterized by introducing the furnace exhaust gases tangentially into the second combustion zone.

10. A method as defined in claim 1 further characterized by altering the mean speed of the furnace exhaust gases in the second combustion zone, at least over a portion of the extent of said zone of the direction of flow, relatively to the speed of said gases upstream of the second combustion zone.

11. A method as defined in claim 1 further characterized by cooling the material treated by means of cooling air in an open heat exchange, and by supplying at least part of the hot cooling air thus produced to the furnace exhaust gas flow.

12. A method as defined in claim 11 further characterized by supplying the hot cooling air produced in the cooling of the treated material to the furnace exhaust gases through the furnace.

13. A method as defined in claim 1 further characterized by supplying the hot cooling air produced in the cooling of the treated material to the second combustion zone through a path which by-passes the furnace.

14. A method as defined in claim 1 further characterized by introducing liquid fuel into the second combustion zone so that it is precipitated, at least partly, on the particles of material and is evaporated therefrom again or burned thereon.

15. A method as defined in claim 1 further characterized by maintaining the material concentration in the second combustion zone so high that the formation of a true flame is at least partly prevented.

16. Apparatus for the heat treatment of material in power form comprising a furnace having an inlet, and a combustion zone in which said material is sintered by furnace gases; means defining a material preheat stage including a separating device having a gas-material separating zone which is connected by a vertical furnace exhaust gas pipe to the furnace inlet, and a material discharge union which is connected with the furnace inlet via a material conduit; a material supply conduit opening into said furnace exhaust gas pipe, whereby the latter serves as a gas-material mixing zone for said preheat stage; and means defining a second combustion zone situated outside the furnace and providing with devices for introducing fuel and air thereto; characterized in that the second combustion zone is located in the furnace exhaust gas pipe and coincides approximately with said mixing zone, said devices for supplying fuel and air opening into the exhaust gas pipe; by means for branching off a return flow of material from the material flow at said preheat stage; and by a return conduit for conveying said return flow to the second combustion zone.

17. Apparatus as defined in claim 16 further characterized in that the separating device has a single separating zone; and in that the means for branching off the return flow comprises a junction fed by the discharge union of said separating zone and having outlets connected, respectively, with the material and return conduits.

18. Apparatus as defined in claim 17 further characterized in that said junction includes a continuously adjustable distributing element.

19. Apparatus as defined in claim 18 further characterized by elements for sensing the pressures in the exhaust gas pipe upstream and downstream of the second combustion zone; and by a pressure difference measuring device which is connected with the pressure sensing elements and is operatively connected via a controller with an adjusting motor which operates the distributing element.

20. Apparatus as defined in claim 16 further characterized in that the separating device comprises two zones equipped with separate exhaust gas ducts arranged in parallel, the separating zones having separate discharge unions connected, respectively, with the material and return conduits.

21. Apparatus as defined in claim 20 further characterized in that the exhaust gas duct of at least one separating zone includes a continuously adjustable closure element located downstream of said zone in the direction of furnace exhaust gas flow.

22. Apparatus as defined in claim 21 further characterized by elements for sensing the pressures in the exhaust gas pipe upstream and downstream of the second combustion zone; and by a pressure difference measuring device which is connected with the pressure sensing elements and is operatively connected via a controller with an adjusting motor which operates the closure element.

23. Apparatus as defined in claim 16 further characterized in that at least one of said devices for supplying fuel and air opens into the second combustion zone in a direction different from the direction of the longitudinal axis of the furnace exhaust gas pipe.

24. Apparatus as defined in claim 23 further characterized in that said devices for supplying fuel and air open into the second combustion zone in different directions.

25. Apparatus as defined in claim 16 further characterized in that the furnace inlet is connected tangentially to the furnace exhaust gas pipe.

26. Apparatus as defined in claim 16 further characterized in that the furnace exhaust gas pipe includes, in the region of the second combustion zone, means for changing its internal cross section.

27. Apparatus as defined in claim 16 further characterized in that the furnace serves as a supply conduit for said device for supplying air to the second combustion zone.

28. Apparatus as defined in claim 16 further characterized in that said device for supplying air to the second combustion zone includes a supply conduit which by-passes the furnace.

* * * * *